United States Patent
Olson et al.

(10) Patent No.: US 12,498,938 B2
(45) Date of Patent: Dec. 16, 2025

(54) BASIC INPUT/OUTPUT SYSTEM (BIOS) BOOT CHECK

(71) Applicant: Schweitzer Engineering Laboratories, Inc., Pullman, WA (US)

(72) Inventors: Ian Olson, Pullman, WA (US); Huba Leidenfrost, Moscow, ID (US); John D. Prestwich, Moscow, ID (US); Ryan Lowell Hendrickson, Spokane, WA (US); Jennice Rinderknecht, Coupland, TX (US); Aaron Taylor, Round Rock, TX (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 72 days.

(21) Appl. No.: 17/818,761

(22) Filed: Aug. 10, 2022

(65) Prior Publication Data

US 2023/0144210 A1 May 11, 2023

Related U.S. Application Data

(60) Provisional application No. 63/277,875, filed on Nov. 10, 2021.

(51) Int. Cl.
| | | |
|---|---|---|
| *G06F 9/00* | (2018.01) | |
| *G06F 9/4401* | (2018.01) | |
| *G06F 9/451* | (2018.01) | |
| *G06F 15/177* | (2006.01) | |

(52) U.S. Cl.
CPC ............ *G06F 9/4406* (2013.01); *G06F 9/451* (2018.02)

(58) Field of Classification Search
CPC .............................. G06F 9/4406; G06F 9/451
See application file for complete search history.

(56) References Cited

U.S. PATENT DOCUMENTS

| | | |
|---|---|---|
| 4,535,306 A | 8/1985 | Yamaguchi |
| 4,546,486 A | 10/1985 | Evans |
| 4,768,178 A | 8/1988 | Conklin |
| 4,808,884 A | 2/1989 | Hull |
| 5,103,466 A | 4/1992 | Bazes |
| 5,235,590 A | 8/1993 | Taguchi |
| 5,363,377 A | 11/1994 | Sharpe |
| 5,793,869 A | 8/1998 | Claflin |
| 5,867,356 A | 2/1999 | Duggal |
| 6,456,831 B1 | 9/2002 | Tada |
| 6,678,134 B2 | 1/2004 | Sugiura |
| 6,754,210 B1 | 6/2004 | Ofek |
| 6,847,691 B2 | 1/2005 | Torikoshi |
| 6,859,742 B2 | 2/2005 | Randall |
| 6,891,441 B2 | 5/2005 | Rochow |

(Continued)

*Primary Examiner* — Mohammed H Rehman
(74) *Attorney, Agent, or Firm* — Fletcher Yoder, P.C.

(57) ABSTRACT

An electronic device includes a processor that performs a basic input/output system (BIOS) process to initialize hardware of the electronic device upon a first start up. The processor determines, within the BIOS process, that initialization of an operating system (OS) on the electronic device has not been performed. The processor waits to receive a user input indicating that the user is ready to initialize the OS, thus protecting the OS initialization process from unintended interruptions such as power loss that can cause the OS initialization to fail irreparably. Upon receiving the user input, the processor begins the OS initialization.

20 Claims, 3 Drawing Sheets

---

70

72

74 — BOOT CHECK — 76

BOOT CHECK PROTECTS THE OPERATING SYSTEM (OS) FROM UNEXPECTED POWER LOSSES THAT CAN OCCUR DURING HARDWARE INSTALLATION AND SETUP.

THE FIRST OS STARTUP PROCESS MUST NOT BE INTERRUPTED, AND TYPICALLY REQUIRES YOU TO SPEND FIVE TO TEN MINUTES TO ENTER IMPORTANT INFORMATION SUCH AS A NEW USERNAME AND PASSWORD. BEFORE YOU PROCEED, MAKE SURE YOU HAVE ADEQUATE TIME AND INFORMATION TO COMPLETE THE FIRST OS STARTUP.

WHEN YOU ARE READY TO PROCEED WITH OS STARTUP, PRESS THE <F3> KEY. THIS WILL DISABLE BOOT CHECK AND BEGIN THE OS STARTUP. IF NEEDED, YOU CAN RE-ENABLE BOOT CHECK IN BIOS SETUP IN THE BOOT FEATURES SETTINGS.

PRESS <F3> TO BEGIN OS STARTUP. — 78

ARE YOU SURE? PRESS <ENTER> TO CONFIRM, PRESS ANY OTHER KEY TO CANCEL. — 80

DISABLING BOOT CHECK — 82

(56) References Cited

U.S. PATENT DOCUMENTS

| | | |
|---|---|---|
| 6,937,683 B1 | 8/2005 | Ratzel |
| 6,947,269 B2 | 9/2005 | Lee |
| 7,239,581 B2 | 7/2007 | Delgado |
| 7,272,201 B2 | 9/2007 | Whitehead |
| 7,283,568 B2 | 10/2007 | Robie |
| 7,463,467 B2 | 12/2008 | Lee |
| 7,571,216 B1 | 8/2009 | Mcrae |
| 7,617,408 B2 | 11/2009 | Frazier |
| 7,701,683 B2 | 4/2010 | Morris |
| 8,351,433 B2 | 1/2013 | Morris |
| 11,522,358 B2 | 12/2022 | Nelms |
| 2001/0023464 A1 | 9/2001 | Deck |
| 2002/0069299 A1 | 6/2002 | Rosener |
| 2002/0080808 A1 | 6/2002 | Leung |
| 2004/0196855 A1 | 10/2004 | Davies |
| 2006/0044950 A1* | 3/2006 | Tung ......................... G06F 3/14 369/30.01 |
| 2006/0129797 A1* | 6/2006 | Durfee ................. G06F 21/575 713/2 |
| 2007/0002746 A1 | 1/2007 | Shankar |
| 2007/0127487 A1 | 6/2007 | Kim |
| 2007/0147415 A1 | 6/2007 | Marusca |
| 2007/0256067 A1* | 11/2007 | Chahal ...................... G06F 8/63 717/168 |
| 2008/0071482 A1 | 3/2008 | Zweigle |
| 2008/0235355 A1 | 9/2008 | Spanier |
| 2008/0275921 A1* | 11/2008 | Gunabalasubramaniam ............... G06F 11/1446 |
| 2009/0141727 A1 | 6/2009 | Brown |
| 2009/0224526 A1* | 9/2009 | Bildner ................ A43B 1/0054 280/816 |
| 2009/0260083 A1 | 10/2009 | Szeto |
| 2009/0300165 A1 | 12/2009 | Tuckey |
| 2010/0195763 A1 | 8/2010 | Lee |
| 2011/0242709 A1 | 10/2011 | Keda |
| 2012/0078555 A1 | 3/2012 | Banhegyesi |
| 2012/0191961 A1* | 7/2012 | Wu ........................ G06F 9/461 711/170 |
| 2015/0205280 A1* | 7/2015 | Tsuchiya ............ G05B 19/0421 700/20 |
| 2016/0300074 A1* | 10/2016 | Huang ................ G06F 21/6245 |
| 2017/0164201 A1* | 6/2017 | Li ........................... G06F 21/57 |
| 2018/0314458 A1* | 11/2018 | Balakrishnan ........ G06F 9/4406 |
| 2019/0041938 A1 | 2/2019 | Zupanc |
| 2019/0332533 A1 | 10/2019 | Fu |
| 2020/0218809 A1 | 7/2020 | Lam |
| 2021/0004335 A1* | 1/2021 | Chen ................... G06F 13/4282 |
| 2021/0191854 A1 | 6/2021 | Yang |
| 2022/0261256 A1* | 8/2022 | Kim ........................ G06F 9/4411 |
| 2023/0086756 A1* | 3/2023 | Lv ........................... G06F 3/061 709/235 |
| 2023/0133596 A1* | 5/2023 | Friend .................... G05D 23/19 700/276 |

* cited by examiner

BASIC INPUT/OUTPUT SYSTEM (BIOS) BOOT CHECK

CROSS-REFERENCE TO RELATED APPLICATIONS

This application claims priority from and the benefit of U.S. Provisional Patent Application No. 63/277,875, filed Nov. 10, 2021, entitled "BASIC INPUT/OUTPUT SYSTEM (BIOS) BOOT CHECK", which is herein incorporated by reference in its entirety for all purposes.

BACKGROUND

This disclosure generally relates to computing initialization. More particularly, this disclosure relates to a boot check feature that ensures a critical initialization process is not interrupted by power loss during an initial start-up of an electronic device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electrical power generation and delivery systems are designed to generate, transmit, and distribute electrical energy to loads. Electrical power generation and delivery systems may include equipment, such as electrical generators, electrical motors, power transformers, power transmission and distribution lines, circuit breakers (CBs), disconnects, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

To ensure application software and services of the IED begin operating following an event in which the IED loses power, the IED may automatically start-up upon receiving power. That is, the IED may, upon receiving power from a power source, begin running a basic input/output system (BIOS) process that initializes the hardware and firmware of the IED. Upon completing the BIOS process, the processor of the IED may pass execution to a bootloader to automatically start-up an operating system (OS) that manages operation of the IED, such as hardware, application software, and services of the IED. Upon starting up the OS, the IED may then automatically start application software and service processes. By automatically performing the BIOS processes, starting up the OS, and starting software applications and services, the IED may better resume its operations when power is restored following a loss of power event.

During an initial start-up of the IED, as part of the OS process, the processor may perform initializations of memory of the OS that prepare the OS for subsequent start-ups. When the IED is being commissioned, the IED may be installed and connected to a power supply, sometimes temporarily to see if the IED receives power. If power is removed during the initial start-up, memory of the IED may be corrupted or may otherwise not be initialized properly. The corrupted memory or improperly initialized IED may result in the IED being de-commissioned, reset, or otherwise take additional time in commissioning.

DETAILED DESCRIPTION

Figure 1:
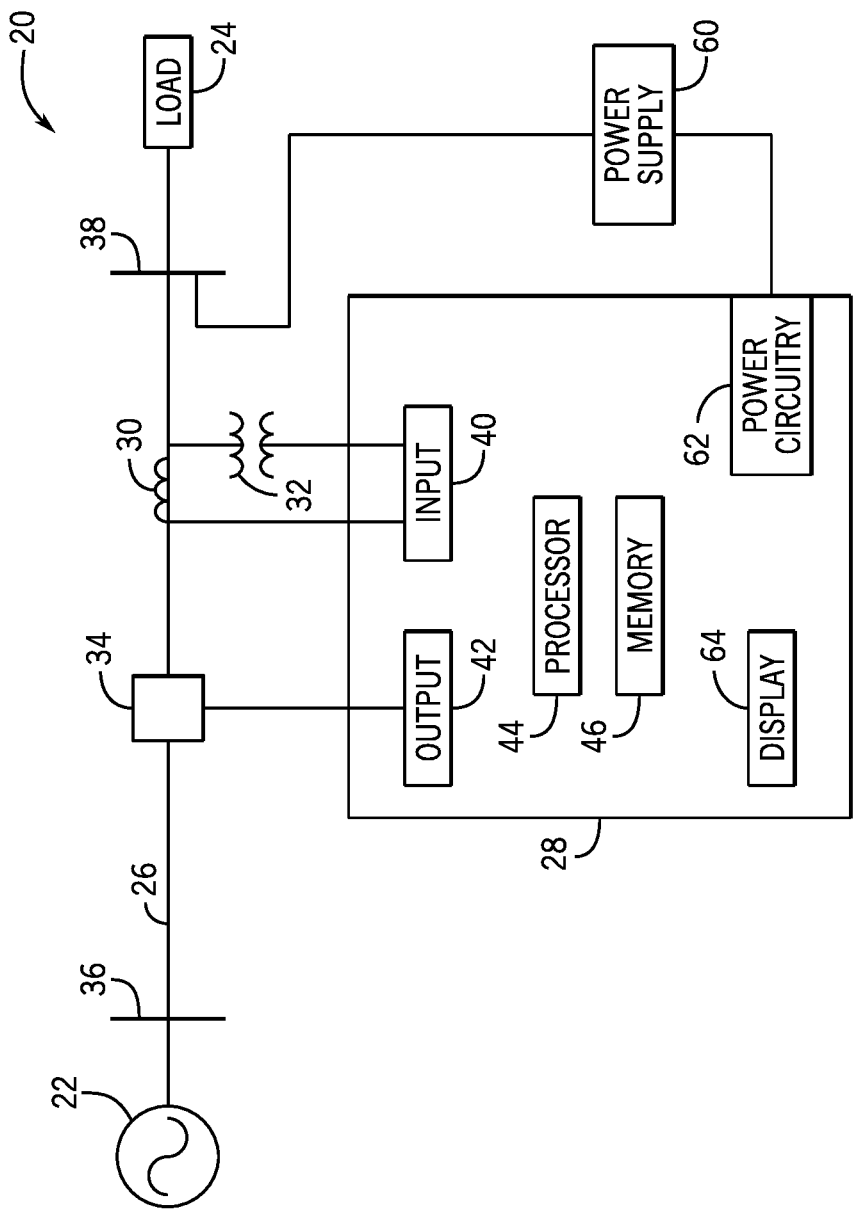
FIG. 1 illustrates a block diagram of a power system with an intelligent electronic device (IED) that monitors, controls, and/or protects the power system, in accordance with an embodiment.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

While IEDs and electric power systems are described in detail below, these are simply meant as examples of an electronic device that may use the start-up process. The start-up processes may be applied in a wide variety of settings and in different fields, which may include consumer or commercial electronics and devices, industrial devices, or other devices in which an initialization of an operating system (OS) occurs prior to subsequent OS start-ups.

Electrical power generation and delivery systems are designed to generate, transmit, and distribute electrical energy to loads. Electrical power generation and delivery systems may include equipment, such as electrical generators, electrical motors, power transformers, power transmission and distribution lines, circuit breakers (CBs), disconnects, buses, transmission lines, voltage regulators, capacitor banks, and the like. Such equipment may be monitored, controlled, automated, and/or protected using intelligent electronic devices (IEDs) that receive electric power system information from the equipment, make decisions based on the information, and provide monitoring, control, protection, and/or automation outputs to the equipment.

To ensure application software and services of the IED begin operating following an event in which the IED loses power, the IED may automatically start-up upon receiving power. That is, the IED may, upon receiving power from a power source, begin running a basic input/output system (BIOS) process that initializes the hardware and firmware of the IED. Upon completing the BIOS process, the processor of the IED may pass execution to a bootloader to automatically start-up an operating system (OS) that manages operation of the IED, such as hardware, application software, and services of the IED. Upon starting up the OS, the IED may then automatically start application software and service processes. By automatically performing the BIOS processes, starting up the OS, and starting software applications and services, the IED may better resume its operations when power is restored following a loss of power event.

During an initial start-up of the IED, as part of the OS process, the processor may perform initializations of memory of the OS that prepare the OS for subsequent start-ups. When the IED is being commissioned, the IED may be installed and connected to a power supply, sometimes temporarily to see if the IED receives power. If power is removed during the initial start-up, memory of the IED may be corrupted or may otherwise not be initialized properly. The corrupted memory or improperly initialized IED may result in the IED being de-commissioned, reset, or otherwise take additional time in commissioning.

As explained below, as part of the BIOS process, the IED may have a boot check setting that indicates whether the IED has performed the initial start-up of the OS. When the boot check setting is enabled indicating that the IED has not performed an initial (i.e., first) start-up, IED may provide an indication to the operator, and wait for inputs confirming the operator is ready for the OS to be initialized. By waiting to confirm that the operator is ready for the initial start-up, start-up of the IED may wait until an operator provides an input to ensure that power is not removed. For example, an indication may be displayed on the IED screen that may prevent the IED from beginning the initial start-up of the OS if the IED receives power as a temporary test during commissioning. Further, by incorporating the boot check setting as part of the BIOS process, the boot check setting may be used independent of the OS installed. While BIOS processes are described in detail below, this is simply meant as an example of initialization firmware that may perform the initial start-up of an OS. As such, it should be understood, that the boot check process described below may be implemented in any suitable initialization firmware. Furthermore, while IEDs and electric power systems are described in detail below, these are simply meant as examples of a device that may use the start-up process. Accordingly, it should be understood that any suitable computing device, such as a personal computer, tablet, mobile device, wearable device, and so forth, may use the start-up process including the boot check.

FIG. 1 is a block diagram of an electric power delivery system 20 that generates, transmits, and distributes electrical energy to loads. The electric power delivery system 20 may include equipment, such as generators (e.g., generator 22), power transformers, loads (e.g., load 24), power transmission and delivery lines (e.g., power line 26), buses (e.g., buses 36 and 38), circuit breakers (e.g., circuit breaker 34), and a variety of other electrical equipment.

The generator 22 may provide electrical energy to the loads 24 via the power line 26. In the illustrated embodiment, the electric power delivery system 20 may be monitored, controlled, automated, and/or protected using intelligent electronic devices (IEDs), such as IED 28. The IED 28 may provide protection, control, automation, and/or monitoring of equipment in the electric power delivery system 20. For example, the IED 28 may monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment. Such IEDs may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, digital sample publishing units, merging units, and the like. As used herein, "IED" may be used to describe an individual IED or a system comprising multiple IEDs.

The electric power delivery system 20 includes current transformer(s) (CTs) 30, potential transformer(s) (PT(s)) 32, and circuit breaker(s) (CBs) 34. The IED 28 may be communicatively coupled to the CTs 30 and PTs 32 to receive signal(s) indicating current measurements and/or voltage measurements of the power line 26. Further, the IED 28 may be communicatively coupled to the CB 34 to send signal(s) to the CB 34 to electrically connect or disconnect electrical equipment from other components of the electric power delivery system 20.

In the illustrated embodiment, the IED 28 includes inputs 40, outputs 42, a processor 44, and memory 46. The IED 28 may include one or more bus(es) and other circuit components connecting the processor 44 to the memory 46, the input 40, and the outputs 42. The memory 46 may be any suitable computer-readable storage medium. The processor 44 may operate using any number of processing rates and architectures. The processor 44 may be embodied as a microprocessor. The processor 44 and/or the memory 46 may be referred to generally as processing circuitry. Additionally, the IED 28 may include a display 64. In some embodiments, the display 64 may be an electronic display, such as an LED screen, LCD screen, plasma screen, projector, or any other suitable electronic display. The processor 44 may control operation of the display 64 to display generated user interface screens during various processes (e.g., BIOS process, start-up process, initialization process). In some embodiments, the display 64 may be viewed by any number of users. As such, multiple users may view the display 64 and may collaborate during the process.

The IED 28 may receive current measurements and/or voltage measurements of the power system 20 and perform monitoring, control, and/or protection operations on the power system 20 based on the current measurements and/or voltage measurements. The processor 44 may process inputs received via CTs 30 and PTs 32. For example, the IED 28 may detect overcurrents on the power system with the current measurements and may send a signal, via the output 42, to the CB 34 to trip the CB 34, thereby disconnecting a portion of the power system 20, to protect the remaining portion of the power system 20. While a single phase is shown in FIG. 1, note that this is simply meant to be illustrative and any suitable number of phases (e.g., three phases) may be monitored and/or protected.

The IED 28 may perform the operations using electrical energy supplied by the power system 20. The IED 28 may include power circuitry 62 that receives electrical energy to provide power to the electrical components of the IED 28 to allow the IED 28 to perform the monitoring, control, and/or protection operations. The power circuitry 62 may receive electrical energy with expected characteristics (e.g., voltage characteristics, current characteristics, etc.) via a power supply 60.

The IED 28 may be designed to operate immediately following receiving electrical energy from the power supply 60. For example, the IED 28 may receive electrical energy from a power source and/or receive a power on from an operator and immediately boot up the OS. However, when the IED 28 is initially turned on (i.e., an initial start-up), an initial boot of the OS may perform various processes as part of the first initialization. More particularly, the initial boot may set software, firmware, and/or hardware settings of the IED 28 for subsequent start-ups. For example, settings may be set in electrically erasable programmable read-only memory (EEPROM), read-only memory (ROM), random-access memory (RAM), solid-state drive (SSD), hard disk drive (HDD), or other non-volatile memory that are then to be used in each subsequent start-up. Premature interruption of the initial OS boot may corrupt the OS, the memory, or otherwise prevent the IED 28 from operating properly. As set forth below, a BIOS setting may be used to reduce or eliminate the likelihood that an operator prematurely interrupts the initial OS boot.

While an IED is described above, this is simply meant to be an example of an electronic device that runs an OS and may start-up automatically. The start-up process may be performed on any suitable electronic device that use an OS.

Figure 2:
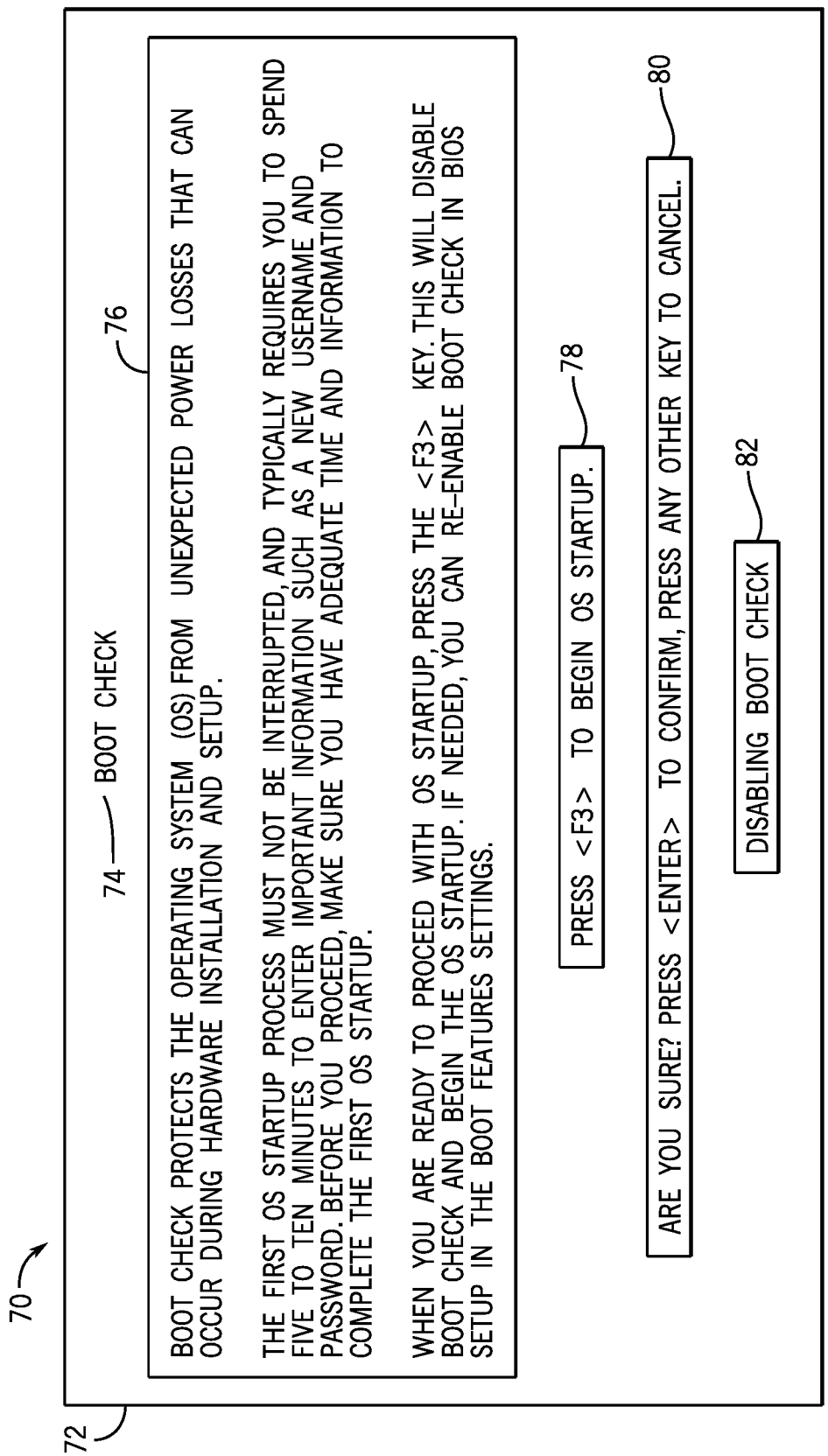
FIG. 2 illustrates a user interface displayed on the IED during a BIOS process; in accordance with an embodiment.

FIG. 2 illustrates a graphical user interface (GUI) 70 that may be displayed on the display 64 of the IED 28 in FIG. 1. The GUI 70 may be displayed before or during a process (e.g., start-up process, initialization process, BIOS process) for the IED 28. The processor 44 may generate the GUI 70 based on a BIOS setting that may be stored in the memory 46. In some embodiments, the processor 44 may receive and/or retrieve instructions stored in the memory 46 and the processor 44 may execute the instructions to generate the GUI 70. The GUI 70 may include a BIOS boot check window 72. The BIOS boot check window 72 may be displayed before initialization of the OS boot and may be enabled by a BIOS boot check setting that indicates whether the IED 28 has performed an initial start-up process. The BIOS boot check window 72 may be a splash screen that indicates how to proceed once the user is ready to setup the operating system and perform the first boot.

The BIOS boot check window 72 may include a title 74 that indicates a descriptor and/or purpose associated with the BIOS boot check window 72. The BIOS boot check window 72 may also include a description 76 associated with the BIOS boot check window 72. The description 76 may indicate a message and/or a warning associated with power loss during the OS start-up process. Additionally, the description 76 may provide information associated with the OS start-up process, such as an estimated time to complete the OS start-up process, that credentials (e.g., username, password) may be utilized during the OS start-up process, and the like. The description 76 may also provide information on enabling, disabling, and/or re-enabling the BIOS boot check setting associated with the BIOS boot check window 72. Additionally, the description 76 may provide information that indicates how to proceed once the user is ready to begin the OS start-up process. For example, the description 76 may include instructions to provide one or more predetermined inputs (e.g., keys, button presses, and the like) in order to proceed with the OS start-up process.

The BIOS boot check window 72 may include a boot check prompt 78 that includes instructions to provide the one or more predetermined inputs that the processor 44 may receive before proceeding with the OS start-up process. The one or more predetermined inputs may include a sequence or order of inputs. The processor 44 may receive inputs and compare to the one or more predetermined inputs to determine whether to proceed with the OS start-up process. For example, the processor 44 may determine a correlation (e.g., match) between the received inputs and the one or more predetermined inputs. In certain embodiments, the processor 44 may first generate and/or update the GUI 70 to display the description 76 and/or the title 74 to allow the user adequate time to read the description 76 before proceeding with the OS start-up process. For example, the processor 44 may display the description 76 and/or the title 74 for a set time period. The processor 44 may also start a timer that counts an elapsed time from starting the display of the BIOS boot check window 72 and/or the description 76. The processor 44 may compare the elapsed time to the set time period to determine when to display the boot check prompt 78. As such, the processor 44 may generate and/or update the GUI 70 to display the boot check prompt 78 upon expiration of the set time period. Additionally or alternatively, the processor 44 may generate and/or update the GUI 70 in response to receiving any input after displaying the description 76.

The BIOS boot check window 72 may also include a confirmation prompt 80 that may include additional instructions to provide one or more additional predetermined inputs in order to confirm the user is ready to setup the OS and perform the first boot. The processor 44 may receive additional inputs and compare to the one or more additional predetermined inputs to determine whether to proceed with the OS start-up process. For example, the processor 44 may determine a correlation (e.g., match) between the additional received inputs and the one or more additional predetermined inputs. The processor 44 may generate and/or update the GUI 70 to display the confirmation prompt 80 in response to receiving the one or more predetermined inputs associated with the boot check prompt 78. In some embodiments, the one or more additional predetermined inputs may be the same or similar to the one or more predetermined inputs provided in the description 76 and/or the boot check prompt 78. Alternatively, the one or more additional predetermined inputs may include one or more different inputs from the one or more predetermined inputs. In some embodiments, the one or more additional predetermined inputs may include a same, similar, or different sequence of inputs from the one or more predetermined inputs. Pressing any other key or interrupting power will result in the system continuing to display the BIOS boot check window 72 upon powering up (following BIOS initialization).

After confirming (e.g., receiving the one or more additional predetermined inputs) the user is ready to begin the OS start-up process, the processor 44 may disable the BIOS boot check setting and may generate and/or update the GUI 70 to display a status message 82 that indicates the BIOS boot check setting is being disabled and/or has been disabled. The BIOS boot check window 72 may include the status message 82 that indicates a status of the BIOS boot check setting and/or the BIOS process. For example, the status message 82 may indicate the boot check setting is enabled, disabled, being enabled, being disabled, and the like. The processor 44 may alter and/or update the GUI 70 based on the status of the BIOS boot check setting. For example, the processor 44 may update the status of the BIOS boot check setting based on receiving the predetermined input and/or the additional predetermined input and may also alter the GUI 70 to reflect the updated status of the BIOS boot check setting. As such, the GUI 70 may prompt and confirm the user is ready to begin the OS start-up process and may prevent corruption of the memory 46 and/or may prevent improper initialization.

Figure 3:
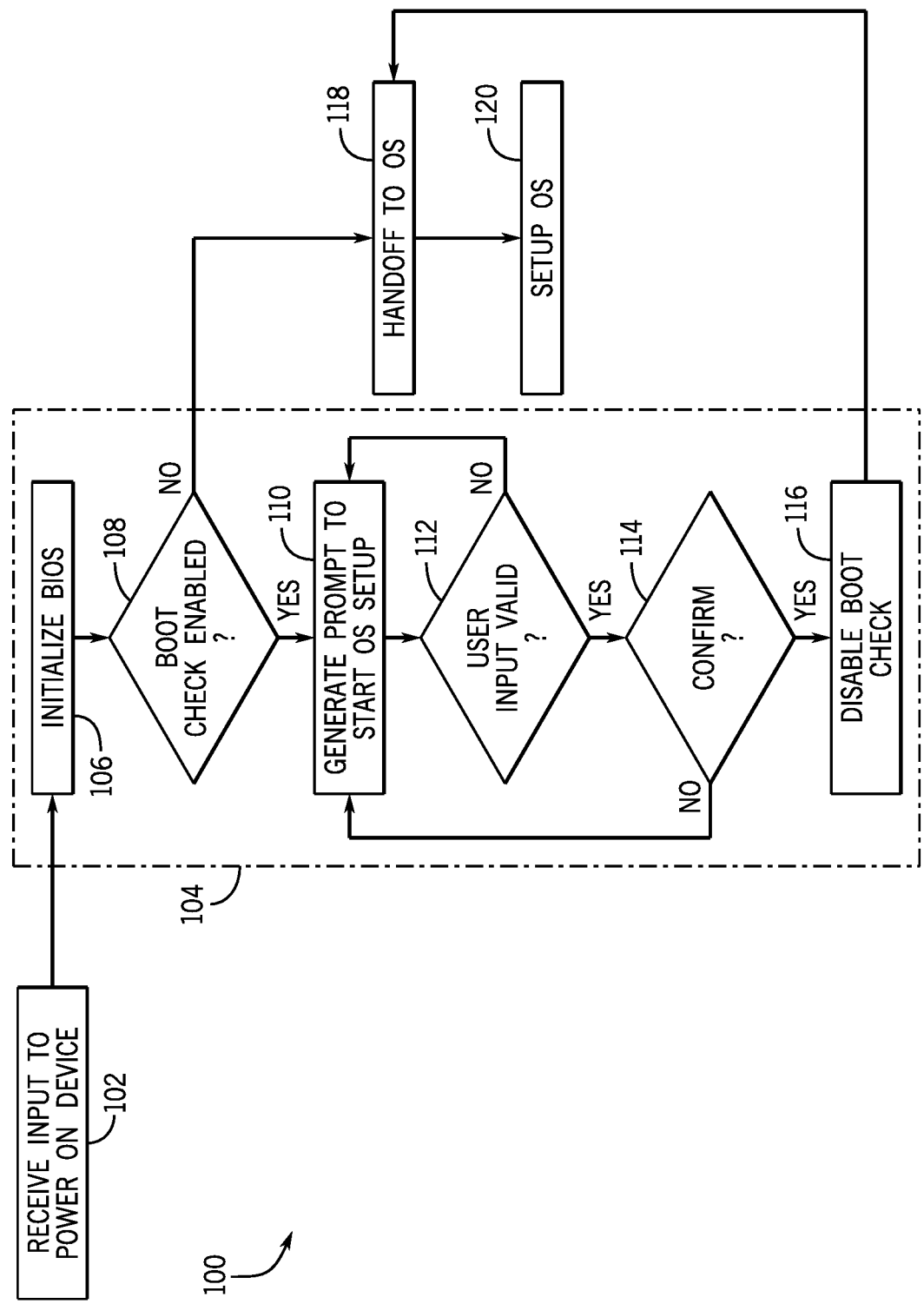
FIG. 3 is a process flow diagram of a process performed by the IED of FIG. 1, in accordance with an embodiment.

FIG. 3 is a start-up process 100 performed by the IED 28 in which the IED 28 prevents initialization of the OS boot until confirmation that the IED 28 is ready for initialization. While IEDs are described in detail, these are meant to be used as an example, and any suitable electronic device that performs a start-up of the OS upon powering up may use the start-up process 100 to ensure that the initial start-up of the OS is performed without interruption or removal of power. Instructions that cause the processor 44 to perform the start-up process 100 may be stored in the memory 46. The IED 28 may store a BIOS boot check setting that indicates whether the IED 28 has performed the initial start-up process.

Any suitable device (e.g., the processor 44) that may control components of the IED 28 may perform the process 100. In some embodiments, the process 100 may be implemented by executing instructions in a tangible, non-transitory, computer-readable medium, such as the memory 46, using the processor 44. For example, the process 100 may be performed at least in part by one or more software components, such as an operating system of the IED 28, one or more software applications of the IED 28, and the like. While the process 100 is described using steps in a specific sequence, additional steps may be performed, the described steps may be performed in different sequences than the sequence illustrated, and certain described steps may be skipped or not performed altogether. Further still, the steps of any of the respective methods may be performed in parallel with one another, such as at the same time, and/or in response to one another.

The start-up process 100 may begin upon power up. Power up may occur upon depression of a push-button, upon receiving electrical energy from the electrical power delivery system 20, upon receiving an electrical signal, or the like. When the IED 28 powers up (block 102), a basic input/output system (BIOS) process 104 may begin in which the processor 44 initializes the firmware, software, and/or hardware of the electronic device (block 106). That is, upon power up, the processor 44 may begin by fetching the first instruction of the BIOS and perform the BIOS process 104 that includes initialization of the firmware and hardware. For example, the BIOS process may execute instructions that initialize registers, inputs/outputs, etc., prior to passing control to a bootloader that begins loading of the OS. Any suitable device (e.g., the processor 44) that may control components of the IED 28 may perform the BIOS process 104. In some embodiments, the BIOS process 104 may be implemented by executing instructions in a tangible, non-transitory, computer-readable medium, such as the memory 46, using the processor 44. For example, the BIOS process 104 may be performed at least in part by one or more software components, such as an operating system of the IED 28, one or more software applications of the IED 28, and the like. While the BIOS process 104 is described using steps in a specific sequence, additional steps may be performed, the described steps may be performed in different sequences than the sequence illustrated, and certain described steps may be skipped or not performed altogether. Further still, the steps of any of the respective methods may be performed in parallel with one another, such as at the same time, and/or in response to one another.

Following BIOS initialization of the firmware, software, and hardware, the processor 44 may determine whether the boot check setting is enabled (block 108). The boot check setting may be a variable (e.g., Boolean) stored in memory, such as the memory 46, and accessed during the BIOS process 104. In certain embodiments, the boot check setting may be initially set to enabled to indicate that the OS has not performed an initial set up process. When the boot check setting is enabled (YES path of block 108), the processor 44 may generate a prompt to start the OS setup (block 110). For example, the BIOS process 104 may include instructions to generate the graphical user interface 70 to display a splash screen (e.g., the boot check window 72) with a message (e.g., description 76, boot check prompt 78) on how to proceed once the user is ready to setup the operating system and perform the first boot. For example, the splash screen may indicate for the user to depress one or more predetermined inputs (e.g., buttons, keys, etc.) to proceed. In some embodiments, the user may be asked to depress multiple buttons simultaneously. Pressing any other key or interrupting power will result in the system continuing to display the Boot Check splash screen upon powering up (following BIOS initialization).

The processor 44 may receive one or more inputs and may compare (block 112) the received inputs to the predetermined inputs. After pressing the predetermined inputs (YES path of block 112), the processor 44 may generate and/or update the GUI 70 to display the confirmation prompt 80 associated with one or more additional predetermined inputs. For example, the splash screen may indicate for the user to depress the one or more additional predetermined inputs to proceed. The processor 44 may receive one or more additional inputs and may compare (block 114) the received additional inputs to the additional predetermined inputs. After pressing the additional predetermined inputs (YES path of block 114), the processor 44 may disable the BIOS boot check setting (block 116). Execution of instructions by the processor 44 may then pass (e.g., handoff) from the BIOS process to a bootloader to begin the OS (block 118). The processor 44 may then begin the OS setup process (block 120). During the initial (e.g., first) OS start-up process, the processor 44 may perform the initializations of software, firmware, and/or hardware that are used in subsequent start-ups of the OS. The boot check setting may be disabled for each subsequent start-up such that, following power up, the processor 44 completes the BIOS initialization 106 and proceeds to immediately pass execution to the bootloader to start the OS without displaying any prompts to start the OS. For example, the processor 44 may determine the boot check setting is disabled (NO path of block 108) and may proceed to pass execution to the bootloader.

If any inputs besides the one or more predetermined inputs are received by the processor 44 at block 112, the processor 44 may return (NO path of block 112) to block 110 and continue to display the splash screen. For example, the display 64 may display the boot check window 72 including the description 76 and/or the boot check prompt 78. Additionally, if any inputs besides the one or more additional predetermined inputs are received by the processor 44 at block 114, the processor 44 may return (NO path of block 114) to block 110 and continue to display the splash screen. For example, the display 64 may display the boot check window 72 including the confirmation prompt 80.

Because the boot check setting and the prompt are part of the BIOS process, the boot check to determine whether the OS is initialized may be performed independent of the OS installed on the IED 28. That is, the boot check setting may be used with any number of different OSs. By ensuring that the operator provides an input to begin the initial OS start-up, the IED 28 is protected from an inadvertent or temporary power up that may otherwise cause memory issues for subsequent start-ups.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An intelligent electronic device (IED), comprising:
a memory;
a processor communicatively coupled to the memory, wherein the processor is configured to:
  perform a basic input/output system (BIOS) process comprising:
    receiving a BIOS setting comprising a boot check variable;
    determining, based on the boot check variable, whether initialization of a first start-up of an operating system (OS) of the IED has not been performed; and
    in response to determining that the initialization of the first start-up of the OS of the IED has not been performed, generating a graphical user interface (GUI) based on the determination; and
a display configured to display the GUI.

2. The IED of claim 1, wherein the GUI comprises a prompt to provide a specific user input.

3. The IED of claim 2, wherein the processor is configured to:
receive a first user input; and
compare the first user input and the specific user input.

4. The IED of claim 3, wherein the processor is configured to proceed with initialization of the first start-up of the OS based on a correlation between the first user input and the specific user input.

5. The IED of claim 3, wherein the processor is configured to update the GUI based on a correlation between the first user input and the specific user input.

6. The IED of claim 5, wherein the display is configured to display the updated GUI, wherein the updated GUI comprises a second prompt to provide a second specific user input.

7. The IED of claim 6, wherein the processor is configured to:

receive a second user input; and
compare the second user input and the second specific user input.

8. The IED of claim 7, wherein the processor is configured to proceed with initialization of the OS based on a correlation between the second user input and the second specific user input.

9. The IED of claim 7, wherein the processor is configured to alter the GUI based on a correlation between the second user input and the second specific user input, wherein the altered GUI comprises a status message associated with the status of the BIOS setting.

10. The IED of claim 1, wherein the memory comprises the BIOS setting.

11. An electronic device, comprising:
a non-transitory computer-readable medium; and
a processor communicatively coupled to the non-transitory computer readable medium, wherein the processor is configured to:
  following power up of the electronic device, determine, within a basic input/output system (BIOS) process, whether initialization of a first start-up of an operating system (OS) on the electronic device has not been performed based on accessing a boot check variable in the non-transitory computer-readable medium;
  in response to determining that the initialization of the first start-up of the OS of the IED has not been performed, prior to exiting the BIOS process, generate a prompt to provide a user input indicating that a user is ready to initialize the OS without interruption to a power supply of the electronic device; and
  based at least in part on receiving the user input, proceed with initializing the first start-up of the OS.

12. The electronic device of claim 11, wherein the processor is configured to:
disable boot check when the user input is received; and
when the boot check is disabled, pass execution to an OS bootloader without waiting to receive any user inputs following power up in each subsequent start-up.

13. The electronic device of claim 12, wherein the boot check is disabled in response to the first start-up of the OS and remains disabled for each subsequent start-up of the OS.

14. The electronic device of claim 11, wherein the processor is configured to determine that initialization of the OS on the electronic device has not been performed based on a boot check variable in the non-transitory computer-readable medium.

15. The electronic device of claim 14, wherein the processor is configured to set the boot check variable to indicate that a boot check has been performed upon receiving the user input.

16. The electronic device of claim 11, wherein the processor is configured to display a splash screen prior to exiting the BIOS process to indicate the user input expected from a user.

17. The electronic device of claim 16, wherein the processor is configured to display the splash screen until receiving the user input.

18. One or more tangible, non-transitory, computer-readable media having stored thereon instructions, that when executed, are configured to cause a processor to:
following power up of an electronic device, begin a basic input/output system (BIOS) process;
receive, as part of the BIOS process, a BIOS setting comprising a boot check variable;

determine, as part of the BIOS process, whether initialization of a first start-up of an operating system (OS) on the electronic device has not been performed based on the boot check variable;

in response to determining that initialization of the first start-up of the OS of the IED has not been performed, prior to exiting the BIOS process, generate a prompt to provide a user input indicating that a user is ready to initialize the OS without interruption to a power supply of the electronic device; and based at least in part on receiving the user input, proceed with initializing a first start-up of the OS.

19. The one or more tangible, non-transitory, computer-readable media of claim 18, wherein the instructions, that when executed, are configured to cause the processor to:

receive the user input;

compare the user input and a predetermined user input; and based on a correlation between the user input and the predetermined user input, proceed with initializing the OS.

20. The one or more tangible, non-transitory, computer-readable media of claim 18, wherein the instructions, that when executed, are configured to cause the processor to:

in response to receiving the user input, generate a second prompt to provide a second user input indicating a confirmation to initialize the OS;

receiving the second user input;

comparing the second user input and a second predetermined user input; and based on a correlation between the second user input and the second predetermined user input, proceed with initializing the OS.

* * * * *